US006721367B1

(12) United States Patent
Miya et al.

(10) Patent No.: US 6,721,367 B1
(45) Date of Patent: Apr. 13, 2004

(54) BASE STATION APPARATUS AND RADIO COMMUNICATION METHOD (75) Inventors: Kazuyuki Miya, Kawasaki (JP); Katsuhiko Hiramatsu, Yokosuka (JP); Hideyuki Takahashi, Yokosuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/434,109

(22) Filed: Nov. 5, 1999

(30) Foreign Application Priority Data

Nov. 10, 1998 (JP) ............................ 10-319354

(51) Int. Cl.[7] ................... H04B 7/10; H04B 17/02
(52) U.S. Cl. ..................... 375/267; 375/347; 375/299; 455/132; 455/101
(58) Field of Search .................. 375/267, 130, 375/347, 260, 259, 299, 341; 455/137, 132, 101

(56) References Cited

U.S. PATENT DOCUMENTS

| | | | | |
|---|---|---|---|---|
| 4,129,870 A | * | 12/1978 | Toman | 342/408 |
| 5,970,406 A | * | 10/1999 | Komara | 370/321 |
| 5,999,826 A | | 12/1999 | Whinnett | |
| 6,031,877 A | * | 2/2000 | Saunders | 375/267 |
| 6,034,634 A | * | 3/2000 | Karlsson et al. | 342/359 |
| 6,144,711 A | * | 11/2000 | Raleigh et al. | 375/347 |
| 6,240,149 B1 | | 5/2001 | Yukitomo et al. | |

FOREIGN PATENT DOCUMENTS

| | | | |
|---|---|---|---|
| CN | 1170282 | 1/1998 | |
| CN | 1195240 | 10/1998 | |
| EP | 0639035 | 2/1995 | |
| EP | 0851600 | 7/1998 | |
| EP | 0869577 | 10/1998 | |
| GB | 0639035 | * 2/1995 | ............ H04Q/7/36 |
| GB | 2313237 | 11/1997 | |
| JP | 6163118 | 4/1986 | |
| JP | 10070494 | 3/1998 | |
| WO | 98/27669 | 6/1998 | |

OTHER PUBLICATIONS

English Language Abstract of JP Appln. No. 10–070494.
Partial English Language Translation of JP Appln. No. 61–3118.

* cited by examiner

Primary Examiner—Tesfaldet Bocure
Assistant Examiner—Qutub Ghulamali
(74) Attorney, Agent, or Firm—Greenblum & Bernstein, P.L.C.

(57) ABSTRACT

When switching to a path whose directivity changes greatly or a path with a widely different propagation delay, transmission is performed for both directivities for a certain period of time. Then, transmission is performed for one directivity. When the switching of transmission directivities is controlled, this allows correct reception of signals and prevents instantaneous interruption due to loss of synchronism even if transmission is performed by switching to a path with a widely different propagation delay.

10 Claims, 11 Drawing Sheets

BASE STATION APPARATUS AND RADIO COMMUNICATION METHOD

BACKGROUND OF THE INVENTION

1. Field of the Invention

The present invention relates to a base station apparatus and radio communication method used in a digital radio communication system.

2. Description of the Related Art

Figure 1:
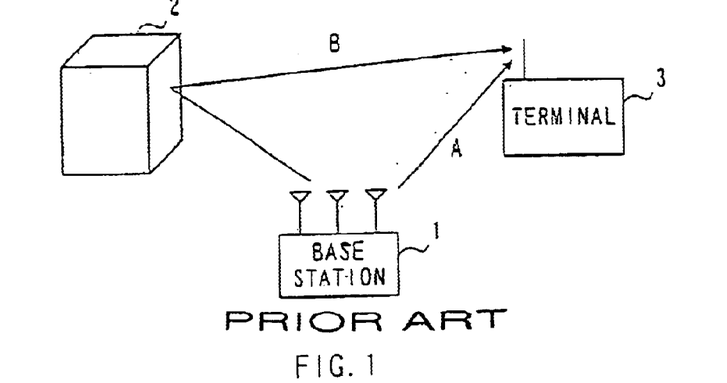
FIG. 1 is a diagram showing a propagation model in a radio communication system.
Figure 2:
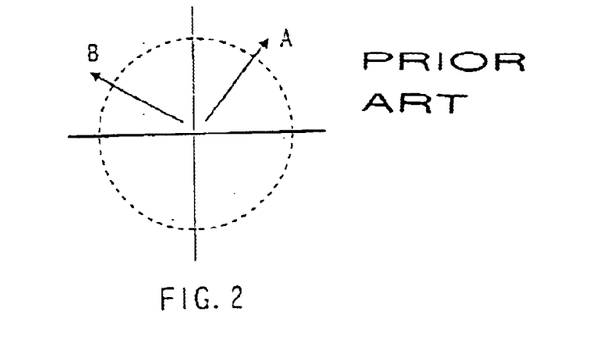
FIG. 2 is a conceptual diagram showing transmission directivity in a radio communication.

A propagation model in a radio communication is explained with reference to FIG. 1. By way of example, suppose the number of antennas of the radio communication apparatus (base station apparatus) is 3. In FIG. 1, two paths A and B indicate downlink (transmission from a base station to terminal) propagation paths. A signal transmitted from base station apparatus 1 is reflected by building 2 and arrives at an antenna of terminal apparatus 3. Such a propagation path is called a "multi-path propagation path" and communication quality generally deteriorates if this multi-path propagation cannot be compensated. In this example, suppose the signal from building 2 is received by the receiving side with a delay within the range of its time resolution. Transmission directivity in this case is shown in FIG. 2.

Thus, if this signal contains a great delay, this delay may be a major factor of deterioration of the communication quality. To suppress multi-path propagation, it is desirable to transmit signals to either path A or path B. Furthermore, a communication system such as a CDMA transmission system in which a same band and time are shared can suppress interference with other stations by narrowing the range of transmission directivity, providing an effective way of achieving high frequency utilization efficiency. Therefore, it is extremely important to detect a direction of an optimal communication quality and perform transmissions focusing on that direction.

Figure 3A:
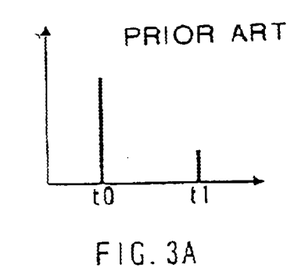
FIGS. 3A to 3C are diagrams showing a delay profile of a reception signal.
Figure 3B:
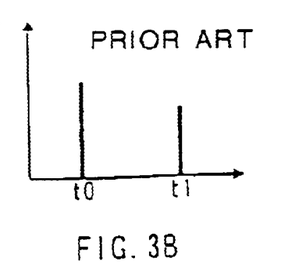
Figure 3C:
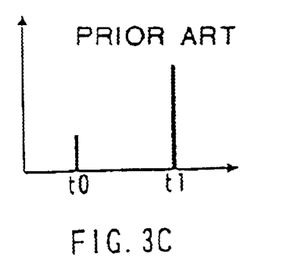

FIG. 3A to FIG. 3C are delay profiles showing the propagation path characteristics of path A and path B in FIG. 1. In FIG. 3, the horizontal axis represents the time and the vertical axis-represents the propagation loss. That is, t0 and t1 on the receiving side represent timings of path A and path B, respectively and the height difference represents a difference in the reception level (difference in propagation loss). The fact that the reception timing differs between path A and path B means that path A and path B differ in the propagation distance.

A delay profile generally changes as a terminal moves. That is, the communication quality of each of path A and path B changes. FIG. 3A shows that the communication quality of path A is better, while FIG. 3B shows that both paths have equivalent levels of communication quality and FIG. 3C shows that the communication quality of path B is better.

Figure 4:
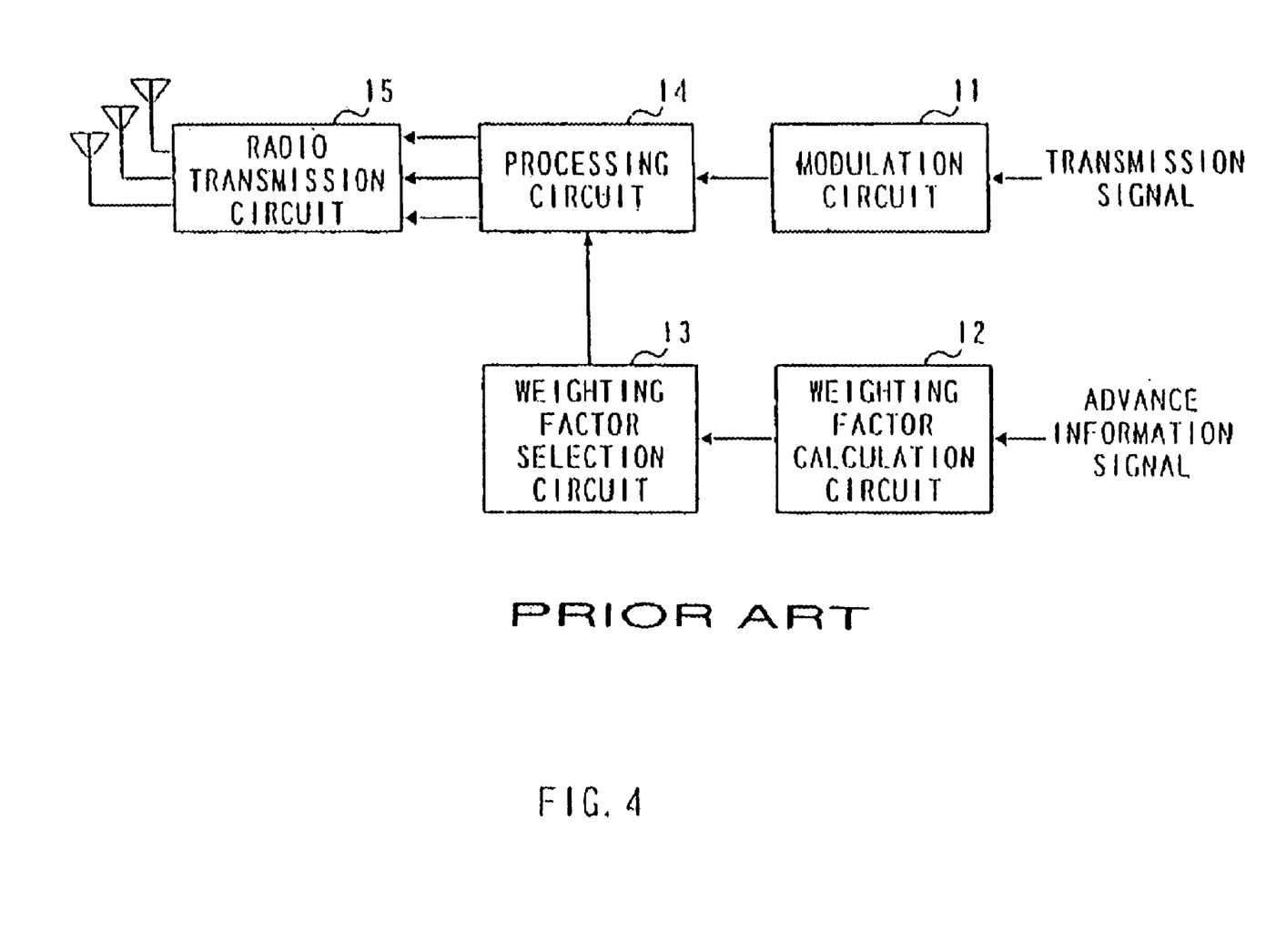
FIG. 4 is a block diagram showing a conventional base station.

A conventional base station apparatus is explained below. FIG. 4 is a block diagram showing a configuration of a base station apparatus that carries out conventional adaptive array transmission. By way of example, suppose the number of antennas is 3.

The transmitting side of this terminal modulates a transmission signal by modulation circuit 11. A plurality of reception weighting factors calculated by weighting factor calculation circuit 12 based on an advance information signal are output to selection circuit 13 where an optimal weighting factor is selected, and processing circuit 14 performs a multiplication (generally complex multiplication) using this weighting factor. Naturally, it is also possible to perform a multiplication after calculating only an optimal weighting factor. Then, radio transmission circuit 15 carries out frequency conversion and amplification on the transmission signal and transmits it from antennas.

In a propagation environment as shown in the delay profiles in FIG. 3, the base station apparatus above performs transmission by forming directivity in the direction of path A when the communication quality of path A is better as shown in FIG. 3A. The base station apparatus also performs transmission by forming directivity in the direction of path B when the communication quality of path B is better as shown in FIG. 3C. On the other hand, if path A and path B have equivalent levels of communication quality as shown in FIG. 3B, the base station apparatus performs transmission by forming directivity in either direction.

Therefore, if the other end of communication is a moving terminal, the delay profiles change with time, and therefore, the base station apparatus shown in FIG. 4 can always perform transmission with array antennas of an optimal communication quality by making its weighting factor selection circuit switch a weighting factor according to a change in the delay profiles.

Here, transmission timing is generally not changed in accordance with directivity switching. This is because in the case of continuous transmission, changing transmission timing will cause problems such as discontinuation or overlap of a transmission signal and collapse of orthogonality (code orthogonality in the case of CDMA, and time orthogonality in the case of TDMA) with other channels with which the transmission signal is multiplexed. etc.

Figure 5:
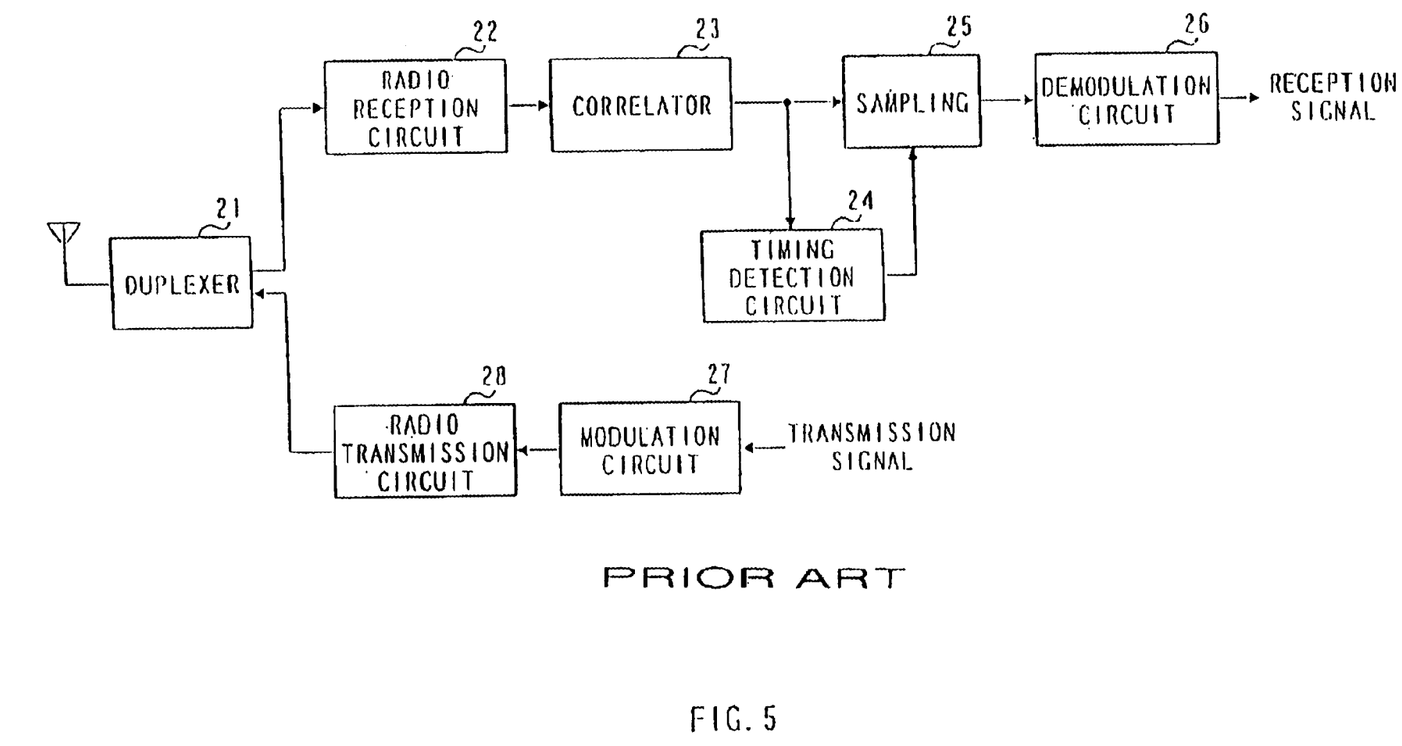
FIG. 5 is a block diagram showing a configuration of a terminal.

The calculation of the receiving side at the other end of communication (terminal) is explained using FIG. 5. On the terminal side, a reception signal received by an antenna is output to radio reception circuit 22 via antenna duplexer 21. Radio reception circuit 22 carries out amplification, frequency conversion and A/D conversion on the reception signal and extracts a baseband signal or IF signal.

In a CDMA system using a spread spectrum (SS) communication system, a reception signal is output to correlator (or matched filter) 23 and despread by the same spreading code as that used for spreading processing on the transmitting side. The despread signal is output to timing detection circuit 24. Timing detection circuit 24 calculates the power of the correlator output and detects time to when the power is large. This timing to is output to sampling circuit 25. Sampling circuit sends the reception signal with timing t0 to demodulation circuit 26. Demodulation circuit 26 demodulates and outputs the reception signal.

On the other hand, a non-CDMA communication system generally sends the extracted baseband signal or IF signal to timing detection circuit 24. Timing detection circuit 24 calculates an optimal reception timing. The optimal reception timing is calculated, for example, by the transmitter side embedding a pattern known to both the transmitter and receiver in a frame and transmitting this signal. The receiver side performs A/D conversion with several to over ten times the one-symbol time and performs a correlation calculation with the known symbol. Then, the receiver side detects timing to when the power resulting from the correlation calculation is large. This timing to is output to sampling circuit 25. Sampling circuit 25 sends the reception signal of timing t0 to demodulation circuit 26. Demodulation circuit 26 demodulates and outputs the reception signal.

On the other hand, the transmission signal is modulated by modulation circuit 27, that is, in the CDMA transmission system, the transmission signal is spread using a predetermined spreading code. The modulated signal is frequency-converted and amplified by radio transmission circuit 28 and transmitted from an antenna via duplexer 21.

Then, the following is an explanation of the calculation of a base station in a radio communication system when adaptive array reception and adaptive array transmission based on information thereof are applied. The calculations of the conventional base station in FIG. 6 and the terminal in FIG. 5 are explained. By way of example, suppose the number of antennas of the apparatus is 3.

First, the uplink is explained. The terminal on its transmitting side modulates a transmission signal by modulation circuit 27. This modulated signal is frequency-converted and amplified by radio transmission circuit 28 and transmitted from the antennas via antenna duplexer 21.

Figure 6:
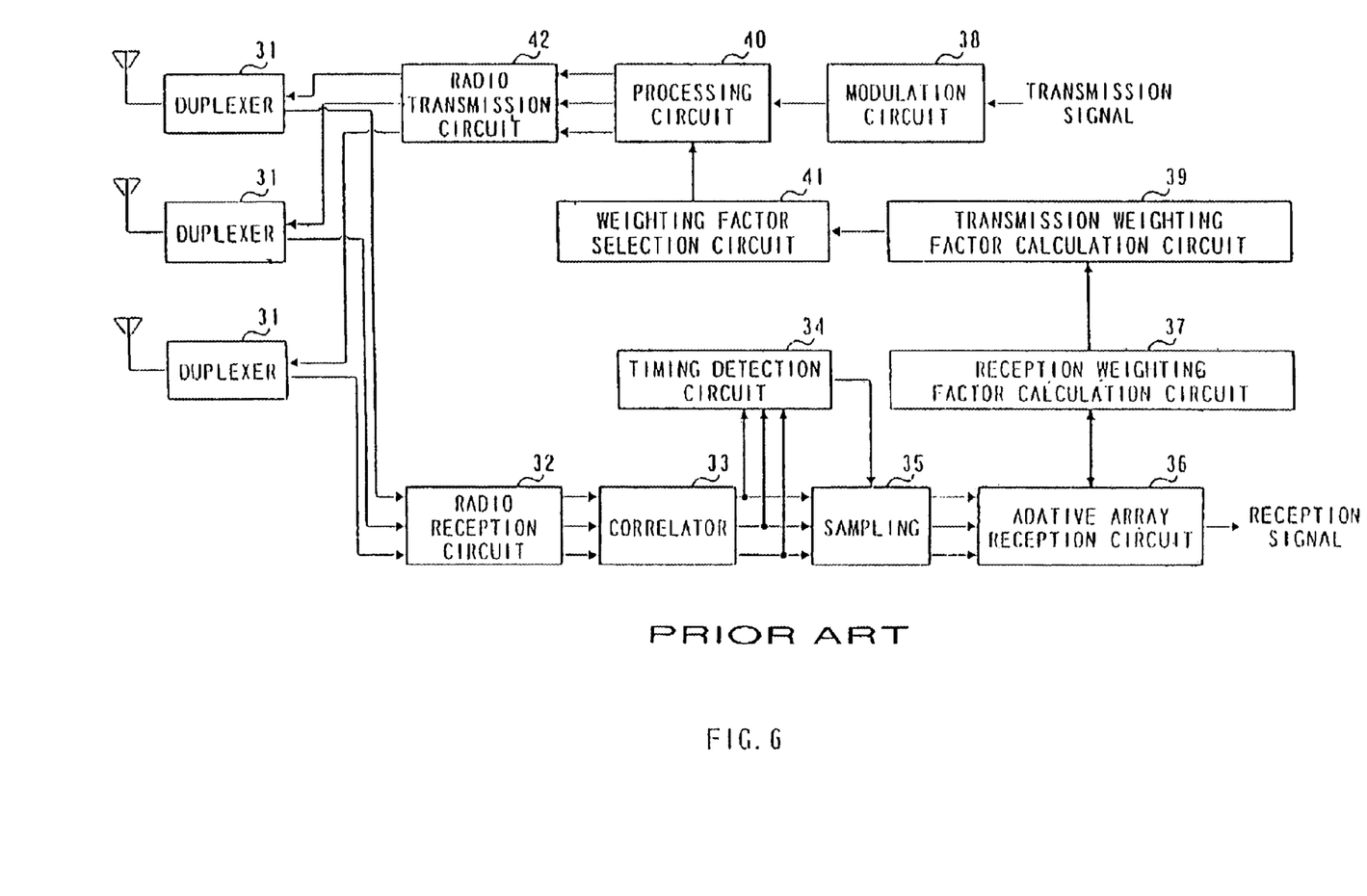
FIG. 6 is a block diagram showing another configuration of the conventional base station.

The base station sends signals received from its antennas to radio reception circuit 32 via respective antenna duplexers 31. Radio reception circuit 32 carries out amplification, frequency conversion and A/D conversion on the reception signals and extracts baseband signals or IF signals. If the transmission and reception signals have the same frequency (TDD transmission), changeover switches are used instead of duplexers. These signals are output to timing detection circuit 34.

Timing detection circuit 34 calculates an optimal reception timing. The optimal reception timing is calculated, for example, by embedding a pattern known to both a transmitter and receiver in a frame and transmitting this signal from the transmitter. The receiver performs A/D conversion with several to over ten times the one-symbol time and performs a correlation calculation with the known symbol. Then, the receiver detects timing t0 when the power resulting from the correlation calculation is large. This timing t0 is output to sampling circuit 35.

Sampling circuit 35 sends the reception signal with timing t0 to adaptive array antenna reception circuit 36. Adaptive array antenna reception circuit 36 combines the reception signals from the three antennas so that a desired wave or SIR reaches a maximum value for each timing. Then, adaptive array antenna reception circuit 36 outputs the reception signals and reception weighting factors to be multiplied on the reception signals of the respective antennas. These weighting factors form reception directivity.

If adaptive array antenna processing is performed so as to extract a desired signal, the directivity is directed to the desired signal, generating a part with small directivity (called "null") in an unnecessary signal (signal identical to the desired signal, which arrives at a different time because the propagation path is different, or signal from another transmitter). The number of null points is known to be (the number of array antennas −1) and if the number of antennas is 3, 2 null points are formed.

In the case of a CDMA system using a spread spectrum (SS) communication system, correlator (or matched filter) 33 performs despreading using the same spreading code as that used for spreading processing for baseband signals or IF signals on the transmitter side. The despread signals are output to timing detection circuit 34. Timing detection circuit 34 calculates the power of the correlator output and detects times t0 and t1 when the power is large. These timings t0 and t1 are output to sampling circuit 35.

Sampling circuit 35 sends the reception signals with timings t0 and t1 to adaptive array antenna reception circuit 36. Adaptive array antenna reception circuit 36 combines the reception signals from the three antennas so that a desired wave or SIR reaches a maximum value for each of reception timings t0 and t1 using the weighting factors calculated by reception weighting factor calculation circuit 37 and finally combines additional reception signals corresponding to 2 paths. Then, adaptive array antenna reception circuit 36 outputs the resultant reception signals and two reception weighting factor sets to be multiplied on the reception signals of the respective antennas. These two weighting factor sets form reception directivities with reception timings t0 and t1, respectively.

Then, the downlink is explained. The base station modulates a transmission signal by modulation circuit 38. Transmission weighting factor calculation circuit 39 regenerates transmission weighting factors based on the reception weighting factors. Then, processing circuit 40 performs a multiplication (generally complex multiplication) by an optimal transmission weighting factor after selecting a weighting factor set by selection circuit 41. At this time, as explained in the calculation of the base station shown in FIG. 4, weighting factor selection circuit 41 can always perform transmission with array antennas of an optimal communication quality by switching between the two transmission weighting factor sets according to changes in the delay profiles.

As shown above, transmitting signals with the same directivity pattern as the reception directivity pattern based on the weighting factors of the reception signals combined through an adaptive array antenna prevents signals being transmitted in directions of unnecessary signals that have arrived, and therefore allows the transmitting side to compensate the multi-path propagation path. This eliminates the need for providing the receiver (terminal side) with high-class devices such as equalizer.

Avoiding transmitting signals in directions of unnecessary signals that have arrived limits the reach of radio waves transmitted, improving thus the downlink frequency utilization efficiency. Since transmission is also performed via a propagation path with the desired wave power on the uplink or with great SIR taking advantage of reversibility of the propagation path, the desired wave power or SIR increases on the downlink as well.

However, when the switching of transmission directivities is controlled according to the conventional system described above, if transmission is performed by selecting a path with a widely different propagation delay, the reception timing on the receiving side suddenly changes, which causes problems such as preventing it from receiving signals correctly until the receiving side detects a new reception timing and switches directivities or causing instantaneous interruption of a reception signal due to loss of synchronism.

In a CDMA system using spread spectrum communications in particular, when the switching of transmission directivities is controlled using reception directivities through a reception adaptive array, if directivity transmission is performed by selecting a path with a widely different propagation delay, the propagation path suddenly changes, which causes problems such as preventing the terminal from receiving signals correctly because a search and finger assignment cannot follow the change or causing instantaneous interruption of a reception signal due to loss of synchronism.

SUMMARY OF THE INVENTION

It is an objective of the present invention to provide a base station apparatus and radio communication method capable of receiving a signal correctly and preventing instantaneous interruption due to loss of synchronism when the switching of transmission directivities is controlled and even when transmission is performed by selecting a path with a widely different propagation delay.

The present inventor has come up with the present invention by discovering that it is possible to solve the problems of the propagation path suddenly changing preventing the terminal from receiving signals correctly because a search and finger assignment cannot follow the change or loss of synchronism even if adaptive array transmission is performed by selecting a path with a greatly different propagation delay.

That is, when selecting a path where a directivity changes greatly, the present invention performs transmission in both directivities like soft handover and the terminal performs reception by combining them. Then, the terminal switches to one directivity according to the reception level. In this specification, this technology is called "path handover (PHO)."

This PHO is especially effective for directivity switching when introducing an adaptive array antenna for the downlink of a W-CDMA system. PHO makes it possible to improve the reception characteristic on the terminal and prevent instantaneous interruption of a reception.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENTS

When switching to a path where a directivity changes greatly, the base station apparatus and radio communication method of the present invention perform transmission in both directivities such as soft handover and the terminal performs reception by combining them. Then, one directivity is switched according to the reception level. The base station determines this switching to PHO. Switching to one path (directivity) is performed by two methods; method of the base station autonomously determining the switching or feedback method by notifying a shift to PHO to a mobile station beforehand. The method of the base station autonomously determining the switching is further divided into a method of the mobile station determining the switching at the path reception level of uplink adaptive array antenna reception and method of the mobile station determining the switching at the reception level of each PHO path.

Furthermore, the base station selects a reception path, which is the source of a transmission directivity, determines whether the directivity of each path is widely different and performs adaptive array antenna transmission with both directivities. In this case, the transmission level of each directivity is controlled.

The present invention is also applicable to a TDMA transmission system. In this case, just two receivers are enough for the mobile station. In a TDMA/CDMA system, the present invention can also be implemented with a single receiver if processing that allows time-sharing of two paths is provided.

With reference now to the attached drawings, the embodiments of the present invention are explained in detail below.

Embodiment 1

Figure 7:
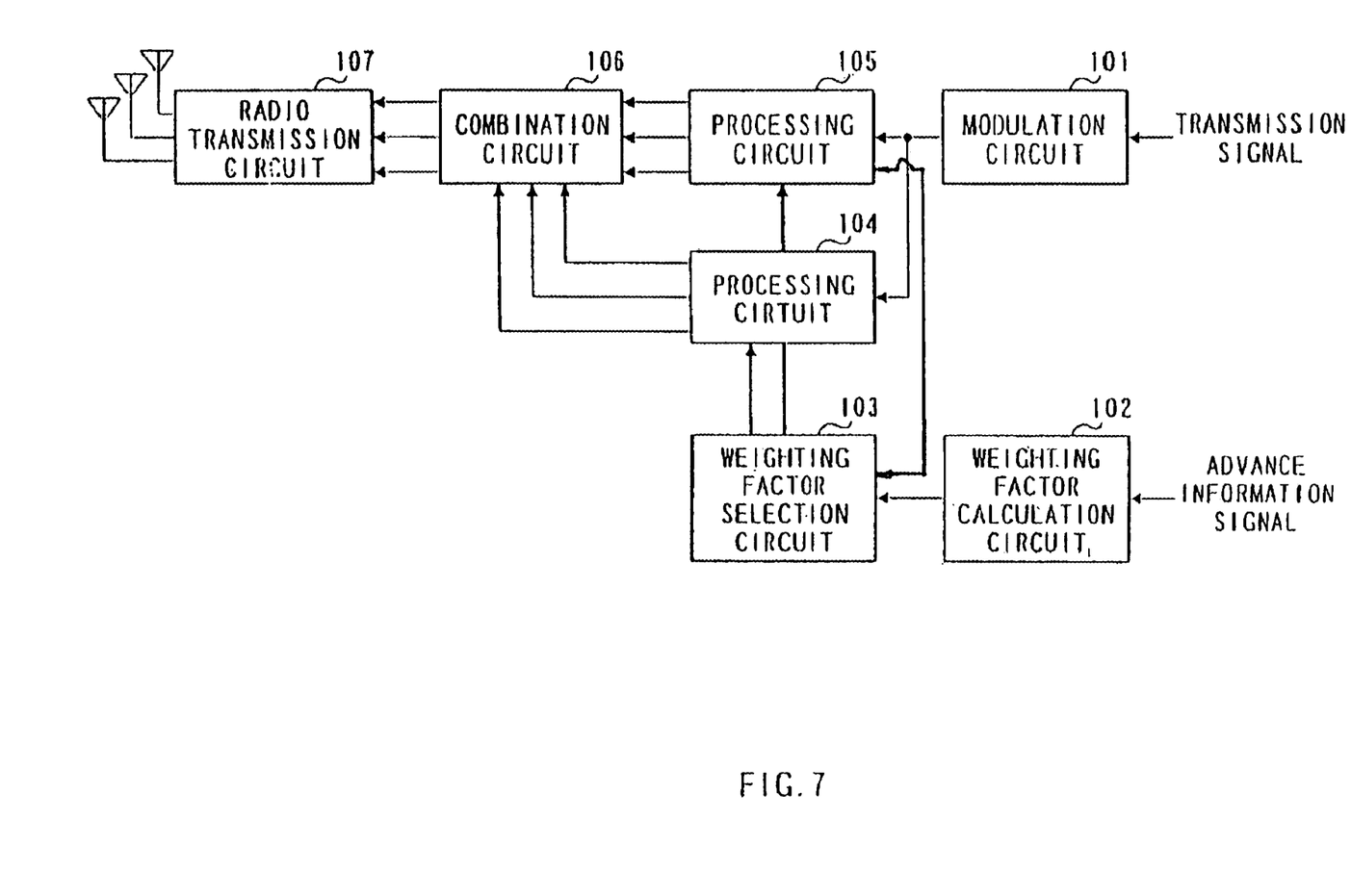
FIG. 7 is a block diagram showing a configuration of a base station according to Embodiment 1 of the present invention.
Figure 8:
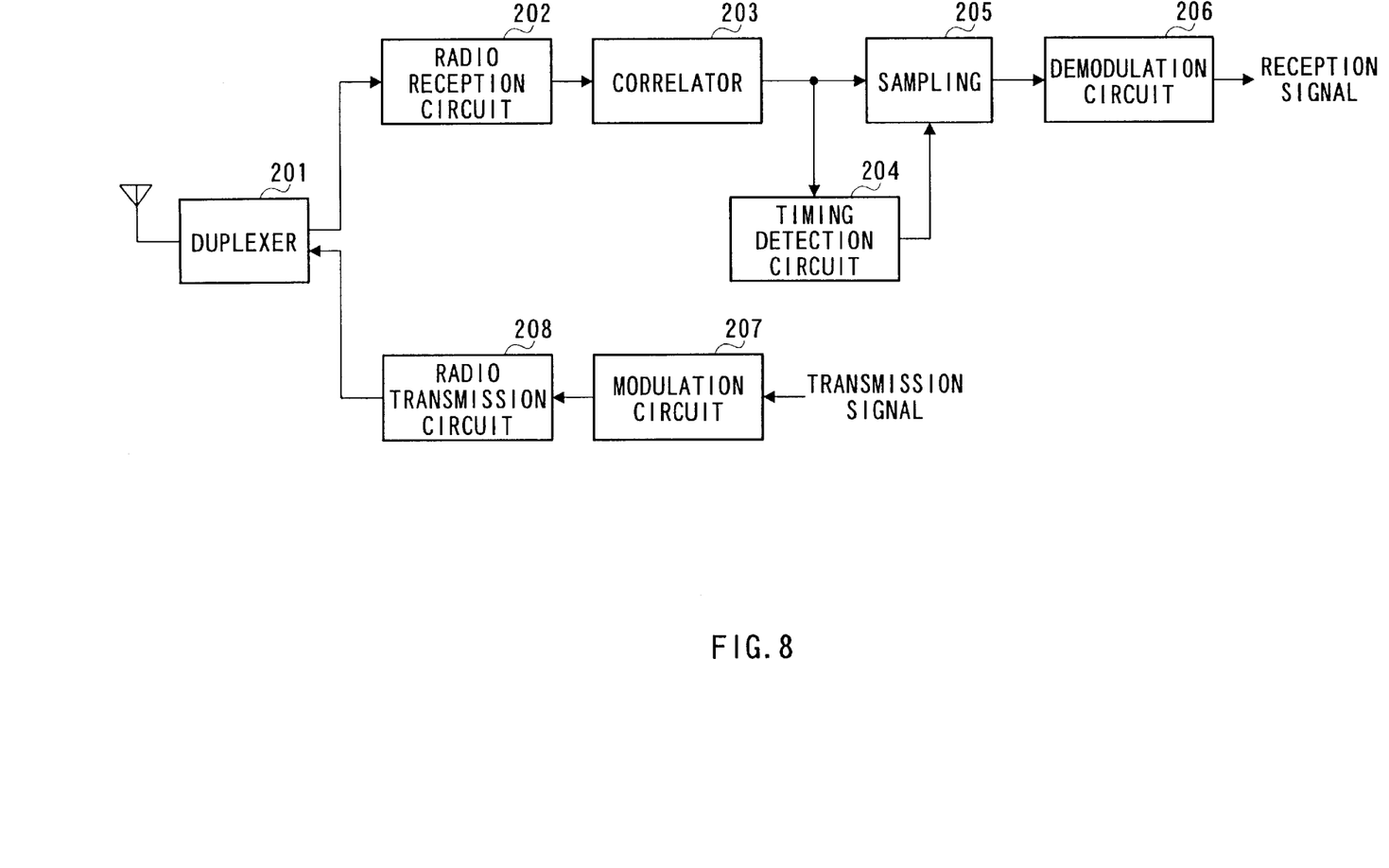
FIG. 8 is a block diagram showing a configuration of a terminal according to the embodiment above.

FIG. 7 is a block diagram showing a configuration of a base station according to Embodiment 1 of the present invention. FIG. 8 is a block diagram showing a configuration of a terminal according to Embodiment 1 of the present invention. FIG. 7 describes only the transmitting side. Here, a CDMA system using a spread spectrum (SS) communication system is assumed.

First, the calculation of the base station shown in FIG. 7 is explained. By way of example, suppose the number of antennas is 3. A transmission signal is modulated by modulation circuit 101. On the other hand, of a plurality of transmission weighting factors calculated by weighting factor calculation circuit 102 based on an advance information signal such as PHO shift, the most suitable one or two weighting factors are selected by weighting factor selection circuit 103 and multiplied by processing circuits 104 and 105. These transmission signals are then combined (multiplexed) by combination circuit 106, frequency-converted and amplified by radio transmission circuit 107 and transmitted from antennas.

The calculation of selection circuit 103 and the calculation of combination circuit 106 are explained in correspondence with the delay profiles shown in FIG. 3. When the delay profile changes from FIG. 3A to FIG. 3B then to FIG. 3C, the communication quality of path A is obviously better than path B in FIG. 3A, and transmission is performed by forming directivity only in the direction of path A. At this time, selection circuit 103 only selects the weighting factor of path A to carry out a product sum calculation. Furthermore, combination circuit 106 does not combine signals and sends only the multiplication signal of one path to radio transmission circuit 107.

On the other hand, if the delay profile changes to FIG. 3B, path A and path B have equivalent levels of communication quality. Conventionally, transmission would be performed by forming a directivity only in either direction, but in the present invention, directivities in the respective directions of path A and path B are formed and signals to be transmitted according to respective directivities are combined and transmitted.

That is, selection circuit 103 selects two weighting factors of path A and path B and performs product sum calculations on their respective modulated signals. Then, combination circuit 106 combines the two signals for each antenna and sends the combined signal to radio transmission circuit 107.

When the delay profile changes to FIG. 3C, the communication quality of path B is better as opposed to FIG. 3A, and transmission is performed by forming a directivity only in the direction of path B. At this time, selection circuit 103 only selects the weighting factor of path B and performs a product sum calculation. Then, combination circuit 106 does not combine signals and sends only the multiplication signal of one path to radio transmission circuit 107.

Figure 9:
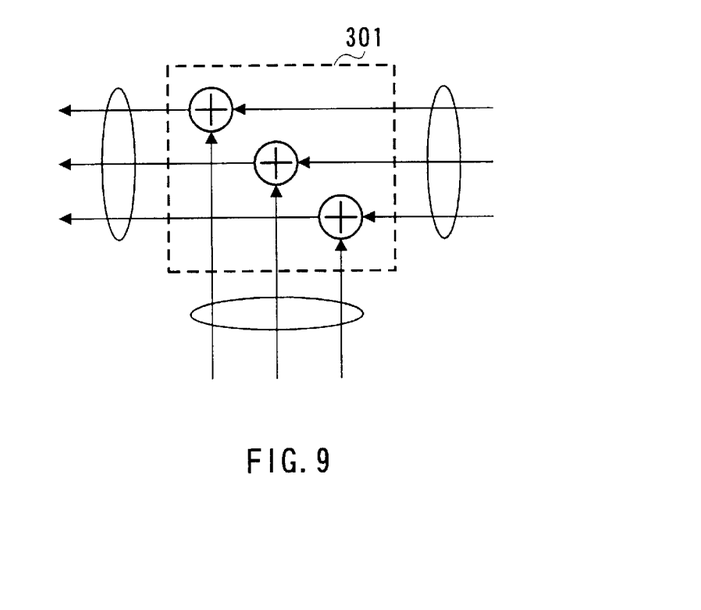
FIG. 9 is a diagram showing a configuration of a combination circuit of the base station according to the embodiment above.
Figure 10:
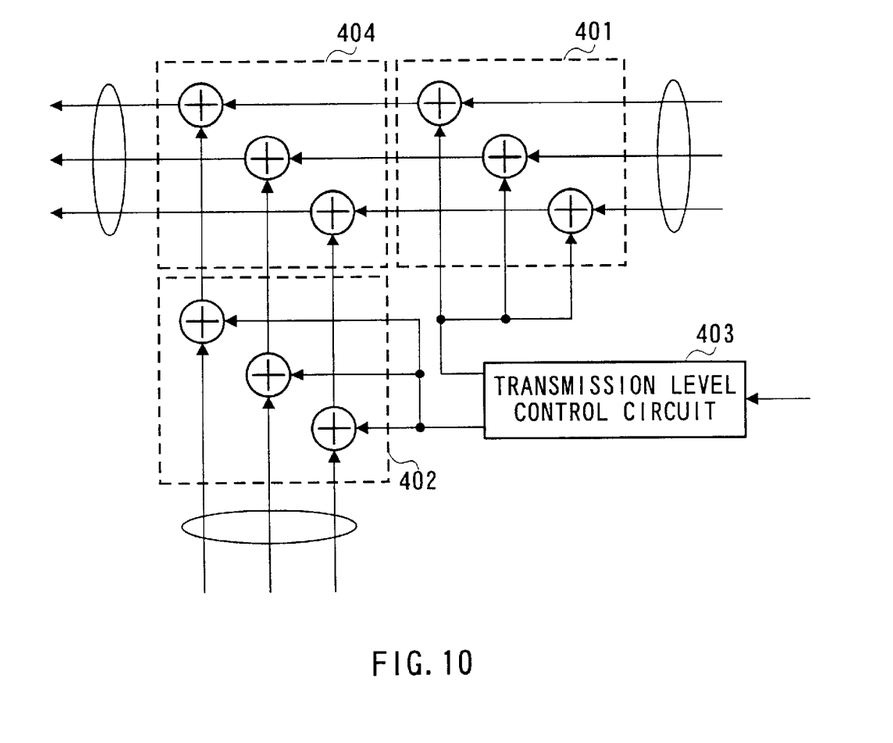
FIG. 10 is a diagram showing another configuration of the combination circuit of the base station according to the embodiment above.

Here, the combination circuit is explained using FIG. 9 and FIG. 10. FIG. 9 shows a basic combination circuit and FIG. 10 shows a combination circuit with a control circuit that individually controls the transmission levels of signals with respective directivities added. That is, in FIG. 9, each signal subjected to a product sum calculation by a weighting factor is multiplied by a coefficient according to the respective transmission levels and combined in combination circuit 301. In this case, transmission of only one signal in the above calculation is performed by setting the transmission level of another signal to 0.

The combination circuit shown in FIG. 10 incorporates transmission level control circuit 403 that individually controls the transmission levels of respective signals subjected to a product sum calculation, and the signals subjected to a product sum calculation are multiplied by coefficients by multiplication sections 401 and 402. The signals whose transmission levels have been individually controlled are combined by combination section 404.

Then, the calculation of the receiving side of the terminal at the other end communication is explained using FIG. 8. On the terminal side, a signal received by an antenna is output to radio reception circuit 202 via antenna duplexer 201. Radio reception circuit 202 performs amplification, frequency conversion and A/D conversion on the reception signal and extracts a baseband signal or IF signal. This baseband signal or IF signal is despread using the same spreading code as that used on the transmitting side by correlator (or matched filter) 203.

Then, the despread signal is output to timing detection circuit 204. Timing detection circuit 204 calculates the power of the correlator output and detects time t1 when the power is large. This timing t1 is output to sampling circuit 205. Sampling circuit 205 sends the reception signal with timing t1 to demodulation circuit 206. Demodulation circuit 206 demodulates and outputs the reception signal. In the CDMA system, timing detection circuit 204 performs a search and finger assignment.

On the other hand, a transmission signal is modulated by modulation circuit 207, and in the CDMA transmission system the signal is spread using a prescribed spreading code. The modulated signal is frequency-converted and amplified by radio transmission circuit 208 and transmitted from the antenna via duplexer 201.

As shown above, the weighting factor selection circuit does not simply switch a weighting factor from path A to path B according to a change in the delay profile, but selects weighting factors of path A and path B when both have equivalent levels of power and transmission is performed with directivities set for both paths. This makes it possible not only to always transmit signals with array antennas with an optimal communication quality, but also to detect a new timing (a search and finger assignment in CDMA) while transmitting with both directivities when the switching of transmission directivities is controlled, which prevents the timing detection circuit in the terminal from failing to perform a switching calculation in time even if directivity transmission is performed by switching to a path with a widely different propagation delay and also prevents instantaneous interruption of a reception signal.

Embodiment 2

Figure 11:
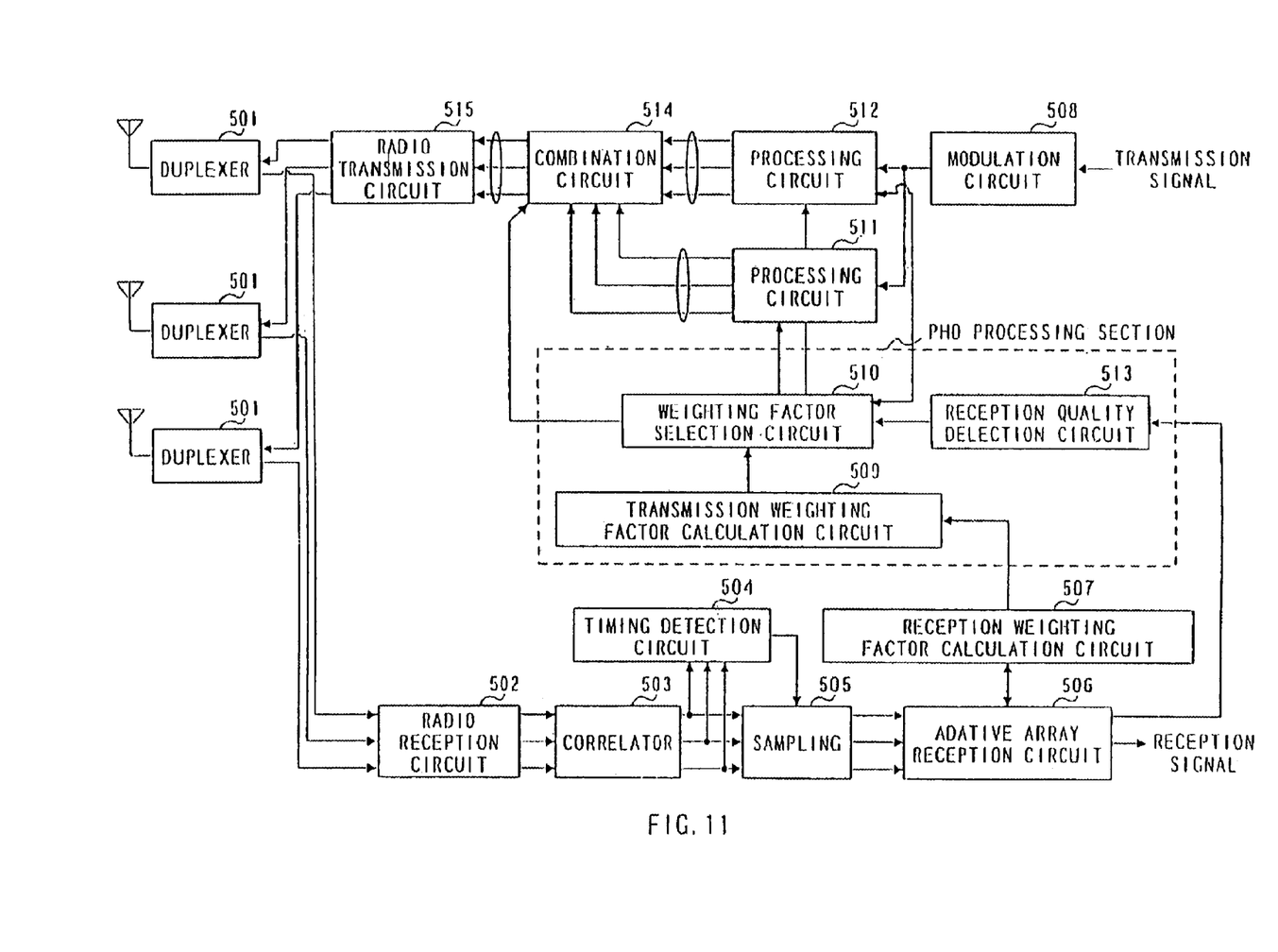
FIG. 11 is a block diagram showing a configuration of a base station according to Embodiment 2 of the present invention.

FIG. 11 is a block diagram showing a configuration of a base station according to Embodiment 2 of the present invention. The present embodiment assumes a CDMA system using a spread spectrum (SS) communication system. Embodiment 2 is explained using a base station to which adaptive array transmission based on adaptive array reception and its information is applied and the terminal at the other end of communication shown in FIG. 8. By way of example, suppose the number of antennas in the base station is 3.

First, the uplink is explained. The terminal on its transmitting side modulates a transmission signal by modulation circuit 207. This modulated signal is frequency-converted and amplified by radio transmission circuit 208 and transmitted from the antenna via antenna duplexer 201.

The base station sends signals received from the antennas to radio reception circuit 502 via antenna duplexers 501. Radio reception circuit 502 carries out amplification, frequency conversion and A/D conversion on the reception signals and extracts baseband signals or IF signals. If the transmission and reception signals have the same frequency (TDD transmission), changeover switches are used instead of duplexers.

These baseband signals or IF signals are output to correlator (or matched filter) 503. Correlator 503 despreads these signals using the same spreading code as that used on the transmitter side. Then, the despread signals are output to timing detection circuit 504. Timing detection circuit 504 calculates the power of the correlator output and detects times t0 and t1 when the power is large and sends these timings t0 and t1 to sampling circuit 505.

Sampling circuit 505 sends the reception signals with timings t0 and t1 to adaptive array antenna reception circuit 506. Adaptive array antenna reception circuit 506 combines the reception signals from the three antennas so that a desired wave or SIR reaches a maximum value for each of reception timings t0 and t1 using the weighting factors and finally combines additional reception signals corresponding to 2 paths. Then, adaptive array antenna reception circuit 506 outputs the resultant reception signals and two reception weighting factor sets to be multiplied on the reception signal of each antenna.

Based on these two weighting factor sets, reception directivities with reception timings t0 and t1 are formed, respectively. That is, the two weighting factor sets from adaptive array antenna reception circuit 506 are output to reception weighting factor calculation circuit 507 where reception weighting factors are calculated. Reception directivities are formed by calculating these reception weighting factors. In this example, two reception timings t0 and t1 are detected, but it is obvious that 3 or more reception timings can also be detected.

Then, the downlink is explained. The base station modulates a transmission signal by modulation circuit 508. On the other hand, transmission weighting factor calculation circuit 509 regenerates transmission weighting factors based on the reception weighting factors calculated by reception weighting factor calculation circuit 507. This transmission weighting factor is output to weighting factor selection circuit 510. Weighting factor selection circuit 510 selects an optimal weighting factor from among a plurality of transmission weighting factors and sends them to processing circuits 511 and 512 and performs multiplication processing on the signal modulated by modulation circuit 508.

Weighting factor selection circuit 510 selects a weighting factor based on the reception quality from reception quality detection circuit 513. This reception quality is detected by adaptive array antenna reception circuit 506 for the reception signal. Transmission weighting factor calculation circuit 509, weighting factor selection circuit 510 and reception quality detection circuit 513 form a PHO processing section. Here, the PHO processing section has the configuration above because a reception quality is used as weighting factor selection information, but the configuration of the PHO processing section may be different if other information (reception timing and directivity pattern) is used as the weighting factor selection information.

Then, the signals subjected to product sum calculation processing are output to combination circuit 514 where the signals are combined (multiplexed) and output to radio transmission circuit 515. Radio transmission circuit 515 performs frequency conversion and amplification on the signals and transmits these signals from the antennas via duplexers 501.

Here, weighting factor selection circuit 510 of the PHO processing section is explained.

Weighting factor selection circuit 510 selects weighting factors based on various kinds of information. The first information is reception quality with each reception directivity or a difference in reception quality between reception directivities. This reception quality includes, for example, the level of a desired wave or SIR. Weighting factor selection circuit 510 selects a path for directivity transmission based on this reception quality information and the number of paths.

Figure 12:
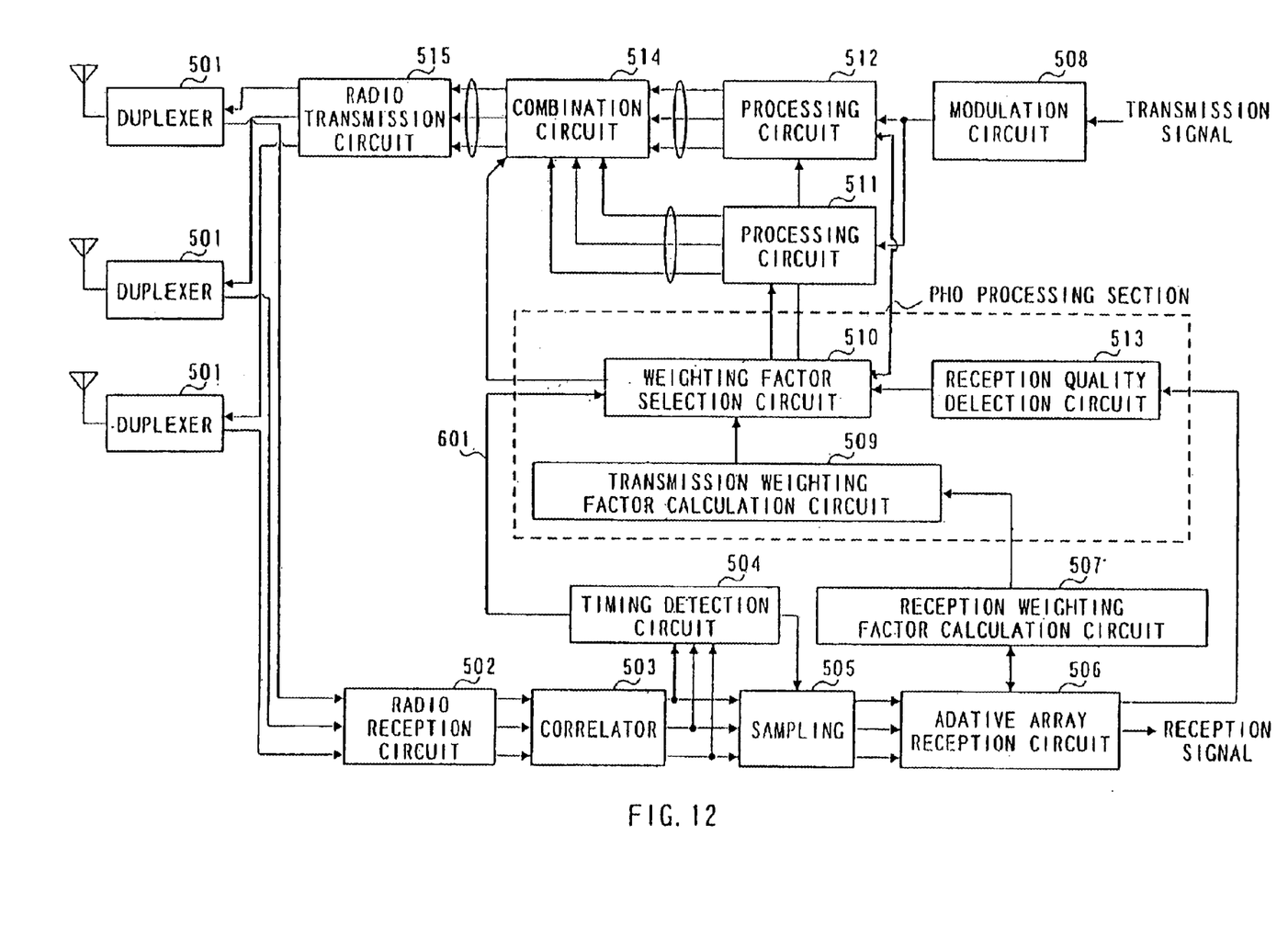
FIG. 12 and FIG. 13 are block diagrams showing another configuration of the base station according to the embodiment above.

Then, the second information is each reception timing or a difference between reception timings. A path with a wide difference between reception timings is likely to have different spatial directivities. Taking account of this tendency, it is determined whether a shift should be made to a PHO state (directivity transmission with 2 paths or more) only based on the timing difference without directly comparing reception directivities. This control can be implemented with the base station shown in FIG. 12. In FIG. 12, a reception timing detected by timing detection circuit 504 is output to weighting factor selection circuit 510 of the PHO processing section. Then, an optimal weighting factor is selected based on the reception timings or their difference. The parts in FIG. 12 identical to those in FIG. 11 are assigned the same numbers and their explanations are omitted.

Then, the third information is a directivity pattern of each reception directivity. In this case, PHO is determined after comparing directivities of paths to be selected (reception directivities or transmission directivities) and determining whether directivities are changed when paths are switched, that is, whether the propagation delay changes greatly. Therefore, if directivities change when paths are switched, PHO is performed. More specifically, this control is performed by storing the weighting factors calculated by reception weighting factor calculation circuit 507 or transmission weighting factor calculation circuit 509, comparing these weighting factors and newly calculated weighting factors and determining the presence of a change in directivities.

The method of using this directivity pattern information can be combined with the method of using the above reception timing information.

When using the first to third information above, it is desirable to control the information using a threshold. When using a reception quality in particular, control using a threshold is essential. For example, if the reception quality of a certain path is within α [dB] from the reception quality of a maximum path, the system controls so that transmission be performed in the direction of the path and if α [dB] is exceeded, the system controls so that the transmission in that direction be stopped. Such control allows high-precision control.

PHO using the weighting factor selection above is autonomously determined and performed by the base station. On the other hand, PHO can also be performed by the base station by getting feedback through a switching control signal from the terminal. That is, the terminal sends information such as the number of paths selected, paths to be selected through the uplink to the base station as a control signal and the base station determines PHO based on that signal or in combination with other information as well.

Figure 13:
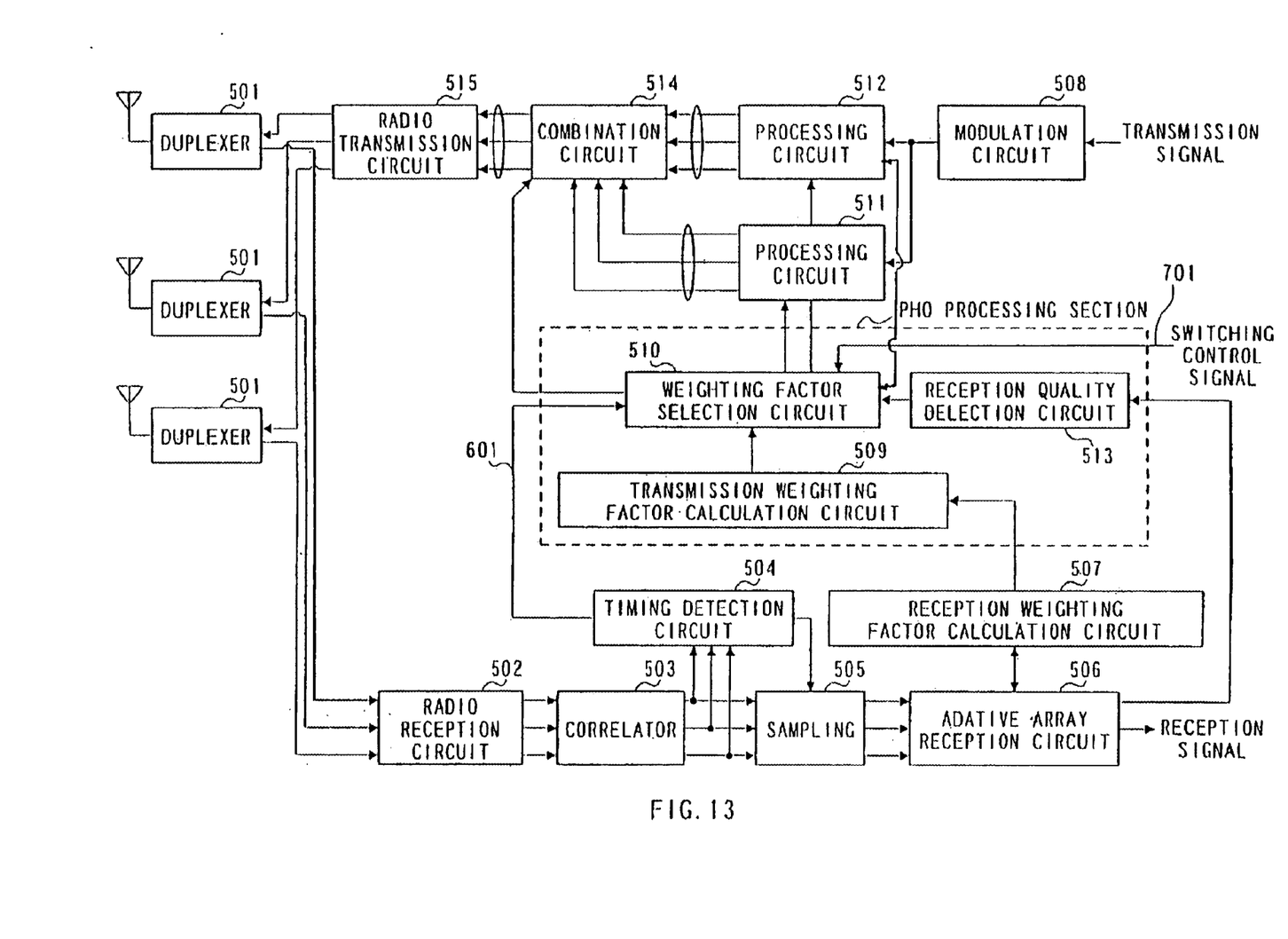

This control can be implemented with the base station shown in FIG. 13. That is, in FIG. 13, a switching control signal is output from the terminal to weighting factor selection circuit 510, where weighting factors are selected based on the switching control signal. The parts in FIG. 13 identical to those in FIG. 11 are assigned the same numbers and their explanations are omitted.

It is desirable to select the weighting factors above as appropriate by a change in directivities of at least two paths, change in propagation loss or change in propagation delay. It is further desirable that the directivities of at least two paths include the directivities being currently in communication and newly obtained directivities. These allow more accurate control.

As the input information for combination circuit 514, the number of paths selected and reception quality information, etc. are input mainly as control of the transmission level. The number of paths selected is used to determine how many paths are combined and transmitted. The reception quality information is used to control the transmission level of each path.

Figure 14A:
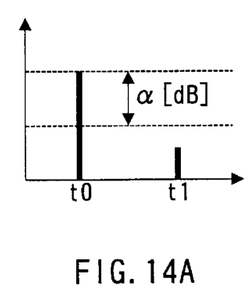
FIGS. 14A to 14C are diagrams to explain threshold switching control of PHO according to the embodiment above.
Figure 14B:
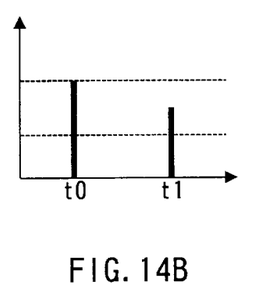
Figure 14C:
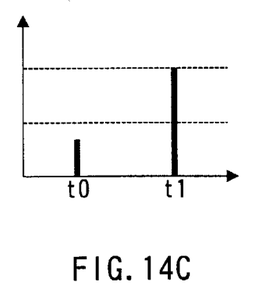

Then, the calculation of weighting factor selection circuit 510 and the calculation of combination circuit 514 are explained using the delay profiles in FIG. 14. Here, α [dB] is set as a switching threshold.

If the delay profile in timing detection circuit 504 on the receiving side changes from FIG. 14A to FIG. 14B then to FIG. 14C, the receiving side detects times t0 and t1 when the reception power is large, sends the reception signals with these timings t0 and t1 to adaptive array reception circuit 506 and combines and receives the directional reception signals.

On the other hand, on the transmitting side, weighting factor selection circuit 510 selects a weighting factor based on the reception quality information of each path from reception quality detection circuit 513. In FIG. 14A, the reception quality of path A excels that of path B sufficiently, and therefore only path A is selected and transmission is performed by forming directivity only in the direction of path A using the transmission weighting factor. At this time, weighting factor selection circuit 510 only selects the weighting factor of path A and performs a product sum calculation using this weighting factor. Combination circuit 514 does not combine signals. Thus, only a signal multiplied by the weighting factor of path A is output to radio transmission circuit 515, subjected to radio transmission processing and then transmitted.

On the other hand, if the delay profile changes as shown in FIG. 14B, the reception quality of path A and path B is within threshold α dB. At this time, the present invention forms directivities in directions of path A and path B and combines and transmits them. That is, weighting factor selection circuit 510 selects two weighting factors of path A and path B and performs product sum calculations on the demodulated signals using these weighting factors. Then, combination circuit 514 combines two signals for each antenna and sends it to radio transmission circuit 515 to subject the signal to radio transmission processing and send it.

If the delay profile changes as shown in FIG. 14C, the communication quality of path B is better as opposed to FIG. 14A, and therefore a directivity is formed only in the direction of path B and transmitted. That is, the weighting factor selection circuit only selects the weighting factor of path B and performs a product sum calculation using this weighting factor. Furthermore, combination circuit 514 does not combine signals. Thus, only a signal multiplied by the weighting factor of path A is output to radio transmission circuit 515 to subject the signal to radio transmission processing and send it.

The configuration of combination circuit 514 is the same as that explained in Embodiment 1, and its explanation is omitted.

As shown above, the weighting factor selection circuit does not simply switch a weighting factor from path A to path B in accordance with a change of the delay profile but selects two weighting factors of path A and path B when both have equivalent levels of power and performs transmission with directivities for both. This not only allows transmission with array antennas with an optimal communication quality all the time but also detection of a new timing (a search and finger assignment in the case of CDMA) while transmitting with both directivities when the switching of transmission directivities is controlled, which prevents the timing detection circuit in the terminal from failing to perform switching calculation in time (failing to perform a search and finger assignment in time) even if directivity transmission is performed by switching to a path with a widely different propagation delay, and prevents instantaneous interruption of a reception signal.

Embodiment 3

The present embodiment describes a case where PHO is applied to a TDMA transmission system. A radio communication apparatus in this case has basically the same configuration as that of the base station shown in FIG. 7. It is different from the base station shown in FIG. 7 in that it has a different combination circuit.

Figure 15:
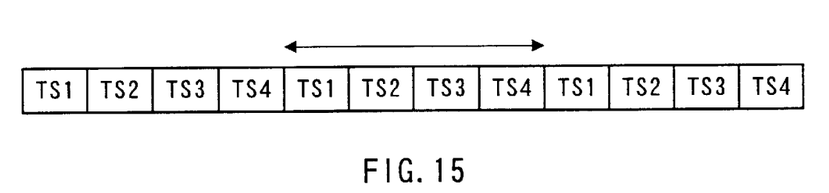
FIG. 15 is a diagram to explain time slots in a TDMA transmission system.

A TDMA transmission system performs transmission in a time slot configuration as shown in FIG. 15. In the TDMA transmission system, it is desirable to suppress multi-path propagation by transmitting signals to either path A or path B. In this case, each signal is transmitted using a separate slot.

Figure 16:
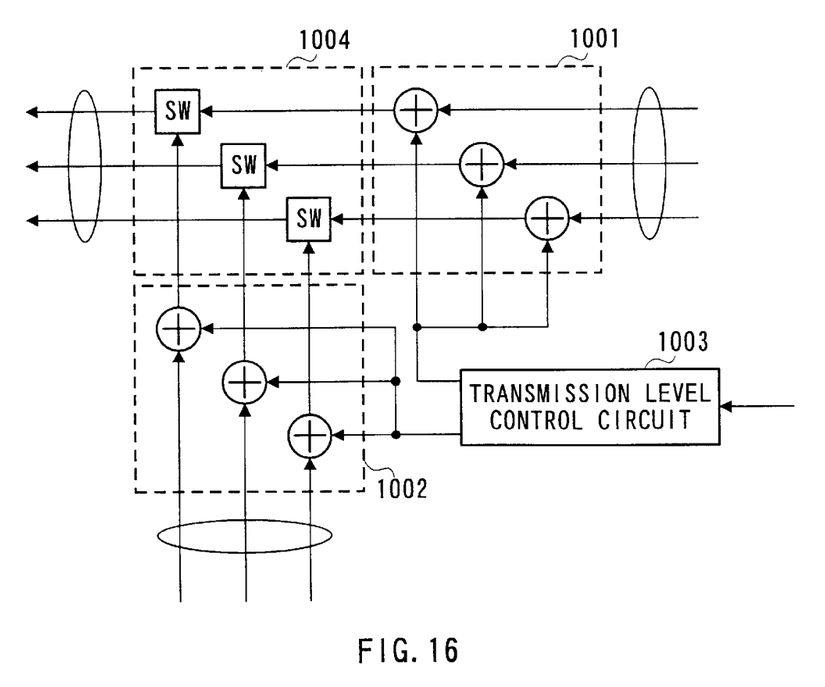
FIG. 16 is a diagram showing a configuration of a combination circuit in a base station according to Embodiment 3 of the present invention.

The combination circuit in this case contains transmission level control circuit 1003 as shown in FIG. 16 that individually controls the transmission level of each signal subjected to a product sum calculation. In this configuration, a signal subjected to a product sum calculation is multiplied by coefficients by multiplication sections 1001 and 1002, respectively. Then, signals whose transmission level is individually controlled are switched at a timing corresponding to its time slot by switching section 1004. In the TDMA system, transmission slot position information, that is, position information of slots to be time-multiplexed when two or more paths are transmitted is input to combination circuit 514.

For example, if the power of path A and path B have equivalent levels of power, the two weighting factors of path A and path B are selected and transmission with directivities for both paths is performed. In this case, path A is output with time slot 1 (TS1) and path B is output with time slot 2 (TS2).

This not only allows transmission with array antennas with an optimal communication quality all the time but also detection of a new timing while transmitting with both directivities when the switching of transmission directivities is controlled, which prevents the timing detection circuit in the terminal from failing to perform switching calculation in time even if directivity transmission is performed by switching to a path with a widely different propagation delay, and prevents instantaneous interruption of a reception signal.

The base station apparatus and radio communication method of the present invention is applicable to a base station apparatus and communication terminal apparatus such as a mobile station in a radio communication system.

The present invention is not limited to the embodiments above, but can be implemented with various modifications. Therefore, it can be implemented by combining the technologies in the embodiments above as appropriate.

As described above, since the base station apparatus and radio communication method in the present invention use path handover when the switching of directivities is controlled, the present invention prevents the timing detection circuit in the terminal from failing to perform switching calculation in time even if directivity transmission is performed by switching to a path with a widely different propagation delay and prevents instantaneous interruption of a reception signal.

The present invention is valid for directivity switching in adaptive array antenna transmission in particular. The present invention is not limited to the above described embodiments, and various variations and modifications may be possible without departing from the scope of the present invention.

This application is based on the Japanese Patent Application No. HEI 10-319354 filed on Nov. 10, 1998, entire content of which is expressly incorporated by reference herein.

What is claimed is:

1. A base station apparatus, comprising:
   a reception quality detector that detects a first reception quality for a first path and a second reception quality for a second path, in association with signals received from a communication terminal apparatus via the first path and the second path, the first path and the second path having different arrival directions;

a former that forms at least one of a first directivity and a second directivity respectively corresponding to the first path and the second path;

a transmitter that transmits signals by switching a transmission directivity between the first directivity and the second directivity in accordance with the first reception quality and the second reception quality detected by the reception quality detector, and the second reception quality is smaller than a predetermined value, and subsequently changes the transmission directivity to the second directivity.

2. The base station apparatus according to claim 1, further comprising:

a reception timing detector that detects a first reception timing for the first path and a second reception timing for the second path, wherein the transmitter transmits signals using both the first directivity and the second directivity, when the first reception timing is different from the second reception timing.

3. The base station apparatus according to claim 1, wherein the former comprises:

an acquirer that acquires information from a reception signal; and a selector that selects weighting factors corresponding to at least one of the first directivity and the second directivity based on the information, wherein the former forms at least one of the first directivity and the second directivity in accordance with the selected weighting factors.

4. The base station apparatus according to claim 3, wherein the acquirer comprises a directional receptor that performs directional reception at timings of a plurality of incoming signals, and wherein the acquirer acquires the information from a signal received from the directional receptor.

5. The base station apparatus according to claim 3, wherein the former further comprises a receiver that receives a switching control signal from a communicating party, and wherein the selector selects the weighting factors based on the switching control signal.

6. The base station apparatus according to claim 3, wherein the selector selects the weighting factors based upon at least one of a change in directivities of the first path and the second path, a change in propagation loss and a change in propagation delay.

7. The base station apparatus according to claim 1, further comprising a controller that controls transmission levels of signals to be transmitted based on the first directivity and the second directivity.

8. The base station apparatus according to claim 1, wherein the first directivity is used in current communication and the second directivity is based upon newly obtained weighting factors.

9. The base station apparatus according to claim 1, wherein the transmitter performs time-multiplexing on signals to be transmitted based on the first directivity and the second directivity in different time slots.

10. A wireless communication method comprising:

detecting a first reception quality for a first path and a second reception quality for a second path, in association with signals received from a communication terminal apparatus via the first path and the second path, the first path and the second path having different arrival directions;

forming at least one of a first directivity and a second directivity respectively corresponding to the first path and to the second path;

transmitting signals by switching a transmission directivity between the first directivity and the second directivity in accordance with the first reception quality and the second reception quality, wherein, while the transmission directivity is being switched from the first directivity to the second directivity, signals are temporarily transmitted using both the first directivity and the second directivity, when a difference between the first reception quality and the second reception quality is smaller than a predetermined value, and subsequently the transmission directivity is changed to the second directivity.

* * * * *

UNITED STATES PATENT AND TRADEMARK OFFICE
CERTIFICATE OF CORRECTION

PATENT NO. : 6,721,367 B1
DATED : April 13, 2004
INVENTOR(S) : K. Miya et al.

It is certified that error appears in the above-identified patent and that said Letters Patent is hereby corrected as shown below:

Column 13,
Line 11, after "detector," insert

— wherein, while the transmission directivity is being switched from the first directivity to the second directivity, the transmitter temporarily transmits signals using both the first directivity and the second directivity, when a difference between the first reception quality —

Signed and Sealed this

Twenty-third Day of November, 2004

JON W. DUDAS
*Director of the United States Patent and Trademark Office*